US011537706B1

(12) United States Patent
Sharifi Mehr

(10) Patent No.: US 11,537,706 B1
(45) Date of Patent: Dec. 27, 2022

(54) RISK-BASED SCHEDULING FOR CREDENTIAL ROTATION

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 263 days.

(21) Appl. No.: 14/578,206

(22) Filed: Dec. 19, 2014

(51) Int. Cl.
*G06F 21/45* (2013.01)
*G06F 21/46* (2013.01)
*H04L 9/40* (2022.01)

(52) U.S. Cl.
CPC .............. *G06F 21/45* (2013.01); *G06F 21/46* (2013.01); *H04L 63/08* (2013.01)

(58) Field of Classification Search
CPC ........... G06F 21/45; G06F 21/46; H04L 63/08
See application file for complete search history.

(56) References Cited

U.S. PATENT DOCUMENTS

| | | | |
|---|---|---|---|
| 7,685,431 B1 | 3/2010 | Mullany | |
| 8,127,141 B2 | 2/2012 | Hyppönen | |
| 8,386,238 B2 | 2/2013 | Spataro | |
| 8,826,396 B2 | 9/2014 | Jancula et al. | |
| 8,959,618 B2* | 2/2015 | Schneider | G06F 21/316 713/156 |
| 2006/0259960 A1* | 11/2006 | Kondo | G06F 21/46 726/6 |
| 2008/0114986 A1* | 5/2008 | Morris | G06F 21/46 713/183 |
| 2009/0150677 A1* | 6/2009 | Vedula | G06F 21/46 713/183 |
| 2011/0083172 A1 | 4/2011 | Heim | |
| 2012/0180124 A1* | 7/2012 | Dallas | G06F 21/46 726/22 |
| 2013/0055379 A1 | 2/2013 | Adams | |
| 2013/0091544 A1* | 4/2013 | Oberheide | G06F 21/45 726/1 |

OTHER PUBLICATIONS

Burr, W.E, et al., "NIST Special Publication 800-63, Version 1.0.2: Electronic Authentication Guideline, Recommendations of the National Institute of Standards and Technology," NIST Publication, Apr. 2006, pp. 1-54.

* cited by examiner

*Primary Examiner* — Jeffrey D. Popham
(74) *Attorney, Agent, or Firm* — Davis Wright Tremaine LLP

(57) ABSTRACT

A service provider receives a set of credentials from a customer and a request to access one or more services provided by the service provider. An authentication service of the service provider receives the set of credentials and, based at least in part on the received set of credentials, one or more activities performed by the customer, the customer's user profile, and the system configuration of the customer's computing device, calculates a risk score. The authentication service subsequently utilizes the calculated risk score to determine a credential rotation schedule for the set of credentials. The authentication service updates one or more servers to enforce the new credential rotation schedule and enables the customer to utilize the set of credentials to access the one or more services.

20 Claims, 8 Drawing Sheets

Please Provide A New Password

New Password: [••••••••] — 302

Confirm New Password: [••••••••] — 304

Password Strength: [▓▓▓▓░] STRONG — 306

The Following Time Was Calculated Based On Your User Profile:

Estimated Password Reset Time: [120] Days — 310

[Accept] — 312     [Cancel] — 314

Please Provide A New Password

New Password: _____ 402

Confirm New Password: _____ 404

Password Strength: [WEAK] 406

The Following Time Was Calculated Based On Your User Profile:

Estimated Password Reset Time: [ 30 ] Days 410

[Accept] 412  [Cancel] 414

Log In To Service

User Name: falv_86 — 502

Password: •••••••••• — 504

Based On Recent Activity, We Have Increased Our Security Protections.

As A Result, Your Password Has Now Expired.

Please Provide A New Password. — 506

New Password: •••••••••• MEDIUM — 508

Confirm New Password: •••••••••• — 510

The Following Time Was Calculated Based On Your User Profile:

Estimated Password Reset Time: 90 Days — 514

Accept — 516    Cancel — 518

RISK-BASED SCHEDULING FOR CREDENTIAL ROTATION

BACKGROUND

Customers and other users often utilize one or more sets of credentials to protect their personal accounts and to enable access to these accounts or other computing resources. As a general business practice, service providers may recommend to these customers and other users to rotate these credentials to reduce the risk of a potential credential leakage or to respond to incidents of credential leakage. For instance, service providers may schedule the rotation of users' credentials at fixed time cycles based on regulatory requirements and/or an organization's internal policies. In such schemes, all credentials may be treated the same in terms of how often these credentials are to be rotated. However, such practices may not take into account the sensitivity of a customer's account to a potential credential leakage, thereby necessitating a shorter rotation cycle. Manually adjusting a fixed credential rotation schedule to account for such sensitivity may be time and resource intensive, thereby making it difficult for service providers to quickly and efficiently address any potential schedule adjustments.

BRIEF DESCRIPTION OF THE DRAWINGS

Various embodiments in accordance with the present disclosure will be described with reference to the drawings, in which:

FIG. 3 shows an illustrative example of an interface in which a risk score and a credential rotation schedule is provided to a customer in response to providing a strong set of credentials in accordance with at least one embodiment;

FIG. 4 shows an illustrative example of an interface in which a risk score and a credential rotation schedule is provided to a customer in response to providing a weak set of credentials in accordance with at least one embodiment;

FIG. 5 shows an illustrative example of an interface in which a customer is required to create a new set of credentials as a result of an updated credential rotation schedule in accordance with at least one embodiment;

DETAILED DESCRIPTION

Figure 1:
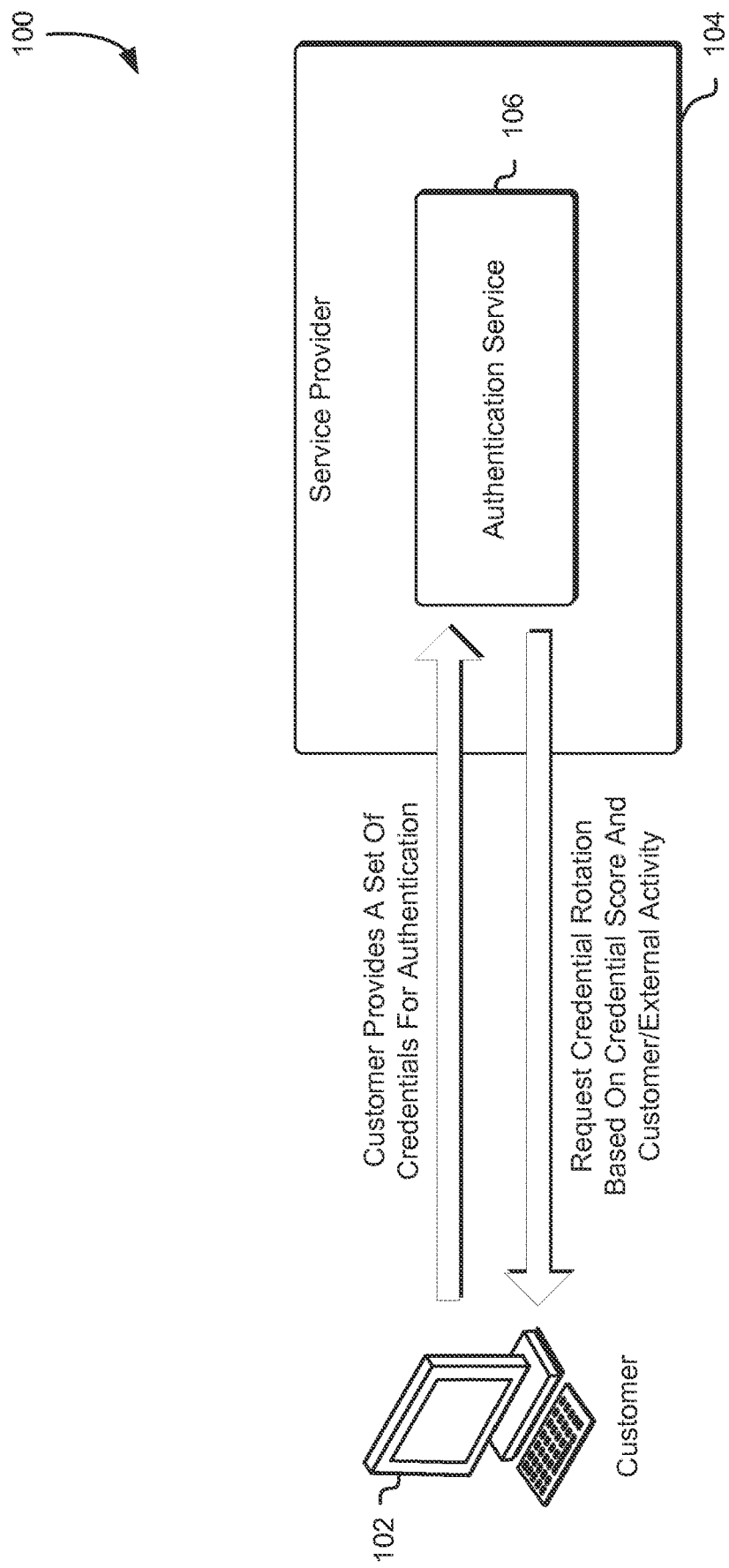
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to dynamic risk-based scheduling of credential rotation for a customer's set of credentials. In an embodiment, an entity (e.g., organization or individual) provides, through an interface provided by a service provider, a set of credentials that may be utilized to access a variety of services provided by the service provider, one or more personal accounts and other computing resources managed and maintained by the service provider. The entity may be a customer of the service provider or other delegated user associated with the customer that may utilize one or more services such as a virtual computer system service, object-based data storage services, database services, marketplace services, and a plurality of other services to create and manage his or her resources, participate in commercial transactions, and to support his or her business needs.

When the entity provides a proposed set of credentials to the service provider, the service provider may evaluate the set of credentials to determine the strength of this set of credentials. Additionally, the authentication service may access one or more activity logs maintained by the service provider to analyze the entity's activities interacting with the service provider and its various services and the entity's computing environment (e.g., device utilized, browsers used to access the service provider, etc.). Other information that may be obtained by the authentication service may include an entity's user profile, which may include the entity's address, Social Security numbers and payment information (e.g., the number of credit cards that may be used for payment without requiring additional input from the entity, associated credit card limits, geographic locations, recent transactions, etc.). Based on the authentication service's analysis of the received set of credentials, the entity's activities within the service provider environment and the entity's user profile, the authentication service may utilize a set of algorithms to calculate a composite risk score for the entity. This composite risk score may be utilized to subsequently calculate a corresponding credential rotation schedule for the entity. In some embodiments, the authentication service, through the interface, may inform the entity of the composite risk score and credential rotation schedule and enable the entity to change the proposed set of credentials in order to improve the risk score and proposed schedule.

In an embodiment, the authentication service, in response to a triggering event or after a particular period of time has passed, will reevaluate the risk score and the credential rotation schedule for the entity's set of credentials. For instance, the authentication service may be configured to periodically update the risk score and credential rotation schedule for an entity's set of credentials by analyzing the entity's user profile, activity logs and any other extenuating factors (e.g., service security breach, new technologies, etc.). The entity's user profile and activity logs may include additional information that may not have been present when initially calculating the risk score and credential rotation schedule for the entity's set of credentials. In an embodiment, if the credential rotation schedule is reduced such that, under this newly computed credential rotation schedule, the entity's set of credentials have expired, the authentication service will transmit a notification (e.g., e-mail, Short Message Service (SMS) message, etc.) to the entity of the change to the credential rotation schedule and the need to rotate his/her set of credentials. Alternatively, the authentication service may wait until the entity attempts to utilize his/her set of credentials through the interface to notify him/her of the need to rotate the set of credentials.

Alternatively, when the entity utilizes the set of credentials to access one or more services provided by the service provider, the authentication service may analyze the entity's set of credentials, user profile, and activity logs to determine whether a newly calculated credential rotation schedule, based on a new risk score, may require the entity to rotate his/her set of credentials. For instance, before enabling the entity to access the one or more services provided by the service provider, the authentication service, through the interface, may inform the entity that as a result of a newly calculated credential rotation schedule, the entity is now required to generate a new set of credentials within a period of time in order to continue access to the one or more services. If, within this period of time, the entity has still not rotated his/her set of credentials, the authentication service may prevent the entity from accessing the one or more services and may require the entity to rotate his/her set of credentials before proceeding. In response to receiving this new set of credentials, the authentication service may again compute a risk score and a credential rotation schedule for this set of credentials.

In this manner, a service provider, through use of an authentication service or component, may be able to automatically calculate a credential rotation schedule for each of its customers based not only on the strength of the set of credentials but also other factors, such as the customer's user profile and activity logs. In addition, the techniques described and suggested herein facilitate additional technical advantages. For example, because the authentication service is configured to evaluate activity logs and a customer's own user profile to calculate and adjust the credential rotation schedule for a set of credentials, the service provider may automatically reduce the time period before the next rotation of credentials is required if the set of credentials is used from multiple locations or is usable by multiple users. This enables the customer to provide a stronger and potentially more secure set of credentials to increase the time allotted in the credential rotation schedule.

FIG. 1 shows an illustrative example of an environment 100 in which various embodiments can be implemented. In the environment 100, a customer 102 may submit one or more requests, through an interface, to a service provider 104 to access one or more services provided by the service provider 104. The customer 102 may be an organization or individual, which may utilize the one or more services provided by the service provider 104 to support his/her business needs. Alternatively, the customer 102 may be a consumer, wherein the service provider 104 may provide the customer 102 with a marketplace that may enable the customer 102 to purchase or sell a variety of products or provide a variety of services to other customers of the service provider 104.

To access the one or more services provided by the service provider 104, the customer 102 may provide, through an interface, one or more sets of credentials that may be used by the service provider 104 to authenticate the customer 102. The set of credentials may include any secret information, such as a shared secret, user password, a username for the customer 102, a personal identification number (PIN), a cryptographic key, or other security data. This set of credentials may be subject to a credential rotation schedule, whereby the customer 102 may be required to rotate his/her set of credentials after a particular period of time has passed. For instance, a set of credentials may only be valid for ninety (90) days, after which time, the customer 102 may be required to generate a new set of credentials in order to access the one or more services provided by the service provider 104. It should be noted that in some embodiments, the customer 102 may only be required to change a portion of his/her set of credentials. For instance, if the set of credentials include a user name and a corresponding password, the customer 102 may only be required to generate a new password that will correspond to the customer's 102 user name.

In an embodiment, when a customer 102 generates a new set of credentials (e.g., creating a new account, voluntary or required credential rotation, etc.), the service provider 104 provides this set of credentials to an authentication service 106 to determine a risk score and the credential rotation schedule for this particular set of credentials. The risk score may be calculated by the authentication service 106 based at least in part on various criteria. For instance, the authentication service 106 may utilize a password complexity analyzer to analyze the set of credentials to calculate an entropy level associated with the set of credentials (or part of the set of credentials during input of the set of credentials). This entropy level may be utilized by the password complexity analyzer to determine the relative strength of the set of credentials and calculate a risk score factor for the set of credentials. Example techniques usable by a complexity analyzer are described in significant detail in U.S. patent application Ser. No. 13/277,423, entitled "Strength-Based Password Expiration," which is hereby incorporated in its entirety by reference.

The authentication service 106 may further access the customer's 102 user profile and activity logs from the service provider 104 (or information generated as a result of analyzing activity logs) to determine the risk score for the set of credentials. The activity logs may specify, for the customer 102, a variety of information that may suggest a greater risk for credential leakage (e.g., the set of credentials are made known to unauthorized entities, whether through computer hacking techniques, social engineering, brute force attacks, etc.). For instance, the activity logs may specify the number of transactions the customer 102 has completed with one or more services of the service provider 104, the amount of money the customer 102 has spent through these one or more services, the Internet Protocol (IP) addresses of the networks through which the customer 102 has utilized a computing device to access these one or more services, the browser applications utilized by the customer 102 to access the interface, the amount of time the customer 102 has spent utilizing these one or more services or accessing a customer account and the like.

The customer's 102 user profile may specify the customer's 102 physical and e-mail addresses, delegated users and payment information, including the number of credit cards that may be utilized for payment and other payment methods (e.g., bank transfers, wire transfers, etc.). Additionally, the customer's 102 user profile may include information calculated from the activity logs (e.g., statistics on activity, etc.). The customer's 102 user profile may further include or otherwise be associated with a set of permissions that can be exercised using the set of credentials. For instance, the set of credentials may be utilized to enable access to sensitive customer information, modify administrative information (e.g., credit card information, etc.), delegate access to the customer's account to other users, and the like. The authentication service 106 may utilize the information garnered from the activity logs and the customer's 102 user profile to calculate another risk score factor that may be utilized to compute the composite risk score for the customer's 102 provided set of credentials.

Additionally, the authentication service 106 may transmit one or more requests to the customer's 102 computing device to obtain information regarding the system configuration of the customer's 102 computing device to further determine the risk score. For instance, the authentication service 106 may evaluate the type of computing device (e.g., desktop computer, laptop computer, smartphone, tablet computer, etc.), the software installed on the computing device, and the hardware utilized by the computing device to determine an additional risk score factor that may be utilized to compute the composite risk score. It should be noted that the authentication service 106 may be configured to analyze other information as needed to calculate additional or alternative risk score factors that may be utilized to compute the composite risk score. Thus, the risk score factors calculated by the authentication service 106 described above are not intended to be an exhaustive representation of the risk score factors calculated by the authentication service 106 to calculate the composite risk score.

Each risk score factor may be multiplied together to generate a final risk score, which may be used to determine the credential rotation schedule for the customer's 102 provided set of credentials. For instance, each risk score factor may be calculated as a value between 1 (e.g., lowest risk) and 10 (e.g., greatest risk), although in some embodiments each factor may be weighed different and thus have a stronger or weaker effect on the final risk score. For example, for the password complexity risk score factor, a lower factor value may be assigned if the set of credentials include a significant amount of complexity such that it would be difficult for an attacker to determine the set of credentials through conventional techniques, whereas a higher factor value may be assigned if the set of credentials are easily discoverable, such as through a weak password (e.g., "password"). As another example, for the customer activity risk score factor, a lower factor value may be assigned if the customer 102 is not involved in a significant amount of transactions, is located in a stable geographic region (e.g., exceedingly low incidence of cyber-terrorism and espionage etc.), and does not have a significant number of payment methods on file within the user profile. As a final example, for the system configuration risk score factor, a lower factor value may be assigned if the customer's 102 computer system utilizes up-to-date hardware components, utilizes message encryption, does not include any malware/spyware, and utilizes current anti-virus and firewall software.

In an alternative embodiment, the authentication service 106 may be configured to assign a different weight to each of the risk score factors based at least in part on a statistical analysis of known sources of credential leakages. For instance, if a particular mechanism for credential leakage associated with a risk score factor is known to have a greater likelihood of occurrence, the authentication service 106 may assign a greater weight to this risk score factor. Subsequently, once each risk score factor has been weighed based at least in part on the commonality of the credential leakage mechanisms (e.g., social engineering, computer hardware tampering, malware/spyware installation, cyberterrorism, etc.) the authentication service 106 may sum these weighted factors together to obtain a raw risk score for the set of credentials. The authentication service 106 may normalize the raw risk score to fit within a particular range. For instance, the authentication service 106 may normalize the raw risk score to generate a final, composite risk score that may be between 0 and 1.

Once the authentication service 106 has computed the final risk score for the customer's 102 set of credentials, the authentication service 106 may utilize one or more algorithms to compute the resulting credential rotation schedule for the customer 102. For instance, if the composite risk score is calculated as a value between 1 and 1000 (e.g., each risk score factor is multiplied together to generate the composite risk score, whereby the maximum possible risk score is 1000), where a lower value denotes a lesser risk of credential leakage, the authentication service 106 may increase the number of days for the credential rotation schedule should the risk score be lower than the median risk score (e.g., 500) or reduce the number of days for the credential rotation schedule should the risk score exceed the median risk score. The default number of days may be established by the service provider 104 or by industry standard (e.g., 90 days). In some embodiments, the authentication service 106 will reject any set of credentials that results in a risk score that exceeds a particular threshold, as the risk may be too great for the customer 102 should the set of credentials be accepted and used.

In some embodiments, the authentication service 106 may utilize the computed final risk score to determine whether the customer's 102 set of permissions should be temporarily modified. For instance, the authentication service 106 may identify, from the customer's 102 user profile, the set of permissions that are associated with the provided set of credentials. Based at least in part on the calculated risk score, the authentication service 106 may temporarily modify the set of permissions until the risk score is reduced, through rotation of the set of credentials and/or any external changes that may result in a lower risk score (e.g., improved technologies for fraud prevention, etc.). For example, if the set of permissions specify that a customer 102 is authorized to perform read and write operations on a variety of computing resources, the authentication service 106 may temporarily prevent the customer 102 from performing write operations if the risk score is higher than a certain threshold. It should be noted that the temporary modification of the set of permissions may not be used to compute the risk score and risk score calculations may only take into account the original set of permissions defined by the customer 102.

Once the authentication service 106 has determined the credential rotation schedule for the customer's 102 set of credentials, the authentication service 106 may enforce the credential rotation schedule and inform the customer 102 if the set of credentials have expired and/or require rotation. In an embodiment, the authentication service 106 continues to analyze the customer's 102 activity logs and user profile to update the risk score for the customer's 102 set of credentials. Additionally, when the customer 102 utilizes his/her computing device to access the one or more services provided by the service provider 104, the authentication service 106 may submit one or more requests to the customer's 102 computing device to obtain updated configuration information for the computing device. This may enable the authentication service 106 to periodically update the risk score and the credential rotation schedule for the set of credentials.

In an embodiment, if the customer's 102 set of credentials have expired due to a change in the credential rotation schedule, the authentication service 106 will transmit a notification to the customer 102 that he/she may be required to rotate his/her set of credentials within a particular period of time. Additionally, or alternatively, when the customer 102 utilizes his/her set of credentials to access the one or more services provided by the service provider 104, the authentication service 106 may inform the customer 102, through the interface, that his/her set of credentials have expired and prompt the customer 102 to provide a new set of credentials. Once the customer 102 has provided a new set of credentials, the authentication service 106 may again determine the strength of the set of credentials, as well as the customer's 102 activity logs, user profile, and computing device system configuration to obtain a new risk score and, hence, a credential rotation schedule for the new set of credentials.

Figure 2:
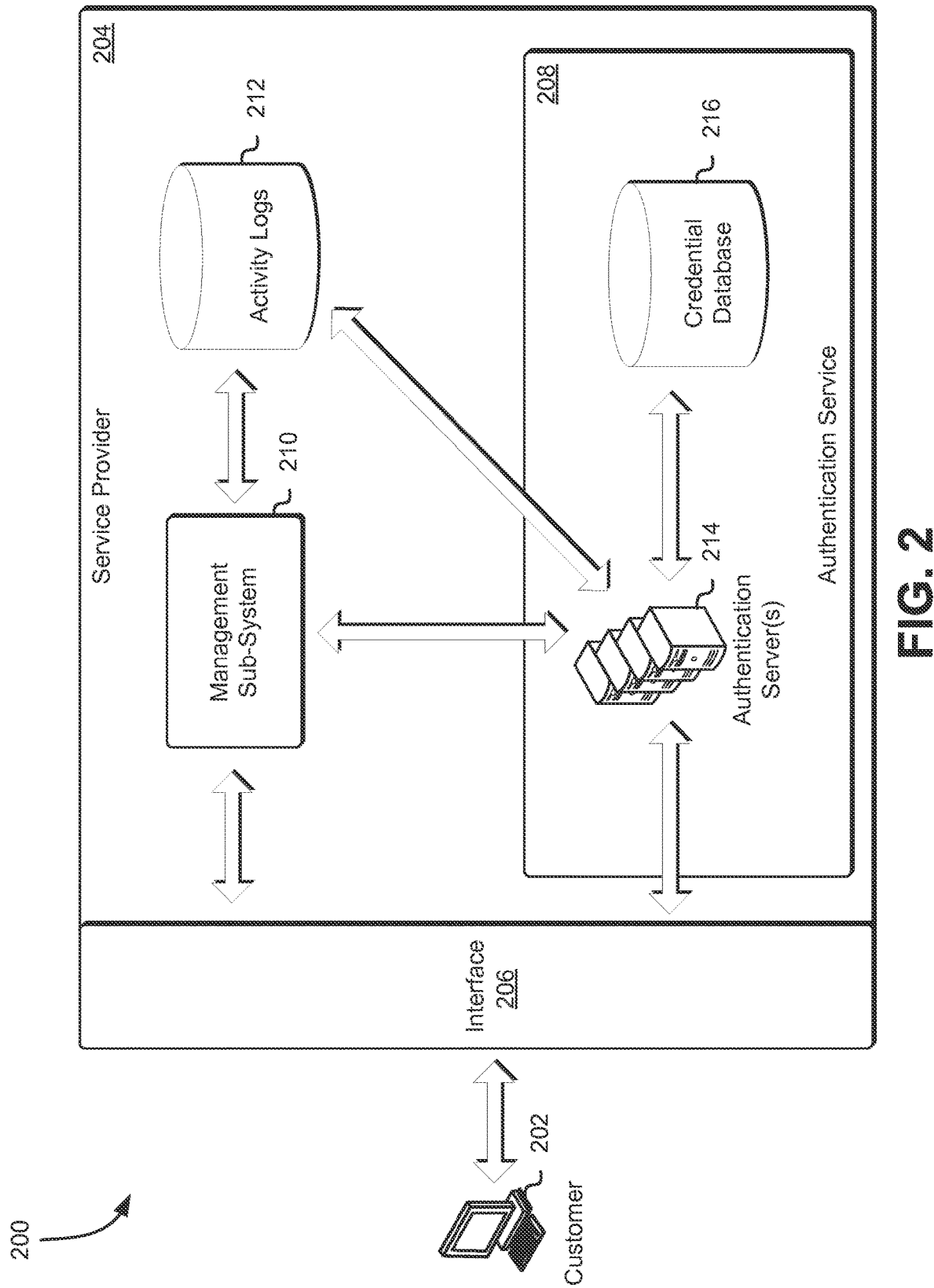
FIG. 2 shows an illustrative example of an environment in which various components of a service provider and an authentication service collectively operate to evaluate a set of credentials and determine a rotation schedule for the set of credentials in accordance with at least one embodiment.

As noted above, a customer may utilize a set of credentials to access one or more services provided by a service provider. The service provider, through an authentication service, may dynamically evaluate this set of credentials and other customer information to calculate and update a credential rotation schedule, which may be utilized to determine when a customer is required to rotate his/her credentials. Accordingly, FIG. 2 shows an illustrative example of an environment 200 in which various components of a service provider 204 and an authentication service 208 collectively operate to evaluate a set of credentials and determine a rotation schedule for the set of credentials in accordance with at least one embodiment. In the environment 200, a customer 202 may access a service provider 204 through an interface 206 to request creation of a user account that may be used to access one or more services provided by the service provider 204. The management sub-system 210, in response to the customer's 202 request, may prompt the customer 202, through the interface 206, to provide a set of credentials that may be used to access the user account and the one or more services provided by the service provider 204.

When the customer 202 provides the proposed set of credentials through the interface 206, the interface 206 may transmit this proposed set of credentials to one or more authentication servers 214 of an authentication service 208 to determine the strength of the set of credentials, a risk score for the set of credentials, and a corresponding credential rotation schedule for the set of credentials. For instance, the authentication servers 214, in response to receipt of the proposed set of credentials, may utilize one or more algorithms or processes, such as the password complexity analyzer described above, to calculate an entropy level for the set of credentials, which may be utilized to determine the relative strength of the set of credentials and calculate a risk score factor for the set of credentials. Additionally, the one or more authentication servers 214 may transmit a request to the customer's 202 computing device to obtain the computing device configuration information, which may be utilized to calculate a second risk score factor.

Additionally, the one or more authentication servers 214 may access one or more activity logs 212 to obtain more information regarding the customer 202. For instance, the management sub-system 210, during the account creation process, may obtain information regarding the applications utilized to interact with the interface 206 (e.g., browser application, any corresponding Java scripts operating within the browser application, etc.) and record this information within an activity log corresponding to the customer 202. Further, the management sub-system 210 may obtain information regarding the network (e.g., IP address, public or private, etc.) through which the customer 202 is accessing the interface 202 and record this within the activity log. The one or more authentication servers 214 may utilize the information from these activity logs to compute an additional risk score factor that may be used to calculate the risk score for the customer's 202 proposed set of credentials.

Once the one or more authentication servers 214 have computed the various risk score factors, the authentication servers 214 may use these factors to calculate a final risk score for the proposed set of credentials provided by the customer 202. Additionally, the authentication servers 214 may utilize one or more algorithms to calculate the credentials rotation schedule for the proposed set of credentials. For instance, in an embodiment, the authentication servers 214 assigns a default credential rotation schedule to a proposed set of credentials if the risk score is within a particular range from a risk score at the middle of the risk score scale. For example, if the risk score is a value between 1 (e.g., lowest risk) and 1000 (e.g., greatest risk), the authentication servers 214 may assign a default credential rotation schedule to any set of credentials with a corresponding risk score two hundred points over 500 or two hundred points below 500. A risk score below this lower threshold (e.g., three hundred) may correspond to a credential rotation schedule that is longer than the default credential rotation schedule. Alternatively, a risk score is greater than the higher threshold (e.g., seven hundred) may correspond to a credential rotation schedule that is shorter than the default credential rotation schedule. It should be noted that the calculation of the credential rotation schedule based at least in part on the computed risk score may include greater granularity, whereby the range wherein the default schedule is assigned may be smaller than described above.

If the customer 202 is satisfied with the proposed credential rotation schedule for his/her proposed set of credentials, the customer 202, through the interface 206, may accept the proposed set of credentials. Accordingly, the authentication servers 214 may store a hash of the set of credentials and the corresponding risk score and rotation schedule within a credential database 216. For instance, the authentication servers 214 may utilize one or more hash functions to hash the set of credentials. In some embodiments, the authentication servers 214 may store the set of credentials themselves such that the one or more hash functions are not required. When the customer 202 utilizes the set of credentials to access the one or more services provided by the service provider 204, the authentication servers 214 may receive the set of credentials from the interface 206 and, based at least in part on information stored within the credential database 216, determine whether the set of credentials have expired. If the set of credentials have not expired, the authentication servers 214 may transmit a request to the managed sub-system 210 to obtain one or more activity logs 212 for the customer 202 and the customer's 202 user profile to calculate a new risk score and corresponding credential rotation schedule.

In an alternative embodiment, the authentication servers 214 are configured to calculate a new risk score and corresponding credential rotation schedule for a customer's 202 set of credentials after a particular period of time has elapsed or in response to a triggering event. For instance, the management sub-system 210 may configure the authentication servers 214 to recalculate the risk score and credential rotation schedule for each customer 202 every two days. Additionally, or alternatively, the authentication servers 214 may be configured to recalculate the risk score and the credential rotation schedule for a particular customer 202 after the customer 202 has successfully interacted with one or more services provided by the service provider 204 a particular number of times. This may enable the authentication servers 214 to obtain a details description of the customer's 202 activities and detect any changes to the customer's 202 profile (e.g., added authorized payment methods, etc.).

Once the authentications servers 214 have computed a new risk score and corresponding credential rotation schedule, the authentication servers 214 may determine if this new credential rotation schedule would cause the set of credentials to immediately expire. If the newly calculated credential rotation schedule would cause the set of credentials to expire, the authentication servers 214, through the interface 206, may notify the customer 202 that a credential rotation is required to proceed. Alternatively, the authentication servers 214 may enable the customer 202 to continue utilizing the set of credentials for a specified period of time, after which the customer 202 may be required to rotate his/her set of credentials to access the one or more services provided by the service provider 204.

As noted above, a customer may provide a proposed set of credentials to the service provider through an interface. This may cause an authentication service to utilize the proposed set of credentials, as well as the customer's user profile, activity logs, and computing device information to calculate a risk score and corresponding credential rotation schedule for the proposed set of credentials. Accordingly, FIG. 3 shows an illustrative example of an interface 300 in which a risk score and a credential rotation schedule is provided to a customer in response to providing a strong set of credentials in accordance with at least one embodiment.

The interface 300 may include a password input field 302 and a password confirmation input field 304, which a customer may utilize to provide a proposed set of credentials to the service provider and, hence, the authentication service. The customer may provide a set of credentials comprising any combination of text, numbers, symbols, punctuation, or words as a potential set of credentials within the password input field 302. The service provider may require the customer to confirm the selection of a new set of credentials by reproducing the proposed set of credentials within the password confirmation input field 304. If the entry within the password confirmation input field 304 does not match the entry within the password input field 302, the interface 300 may notify the customer that the entries do not match. Alternatively, the interface 300 may inform the customer that the entries do not match once the customer has selected the accept button 312.

The interface 300 may further include a password strength display field 306, which may be configured to display the relative strength of the provided set of credentials. As the customer is typing in the characters to be used for the new set of credentials into the password input field 302, the interface 300 may provide the string of characters to the authentication service, which may utilize a password complexity analyzer to analyze the string of characters to calculate an entropy level associated with the part of the set of credentials during input of the set of credentials. This entropy level may be utilized by the password complexity analyzer to determine the relative strength of the set of credentials and calculate a risk score factor for the set of credentials. As the customer changes the string of characters within the password input field 302, the password complexity analyzer of the authentication service may dynamically calculate the strength of the proposed set of credentials and the associated risk score factor. The authentication service may provide the results of its analysis to the interface 300, which may display the relative strength of the proposed set of credentials within the password strength display field 306. This may enable the customer to visually determine whether the provided set of credentials is relatively strong or not. Additionally, the interface 300 may provide additional output, such as utilizing the word "STRONG" as displayed in FIG. 3 next to the password strength display field 306.

It should be noted that while a meter is displayed within the password strength display field 306 to illustrate the strength of a potential set of credentials, other information may be displayed within the password strength display field 306 to demonstrate the relative strength of a particular set of credentials. For instance, instead of a meter, the password strength display field 306 may include a numerical score, a color-coded entry, one or more characters, or any combination thereof to illustrate the relative strength of the set of credentials. For example, the password strength display field 306 may include the textual string "STRONG," illustrated utilizing a green font, to demonstrate that the relative strength of the provided set of credentials is high. Alternatively, the password strength display field 306 may include the risk score factor, as calculated by the authentication service. In addition, the interface 300 may include an explanation as to the meaning of the risk score factor, in order to enable the customer to understand the significance of the factor.

As noted above, the authentication service may utilize the computed risk score factor, a customer user profile risk score factor (e.g., calculated based at least in part on the customer's activity log and information included in the customer's user profile), and a system configuration risk score factor (e.g., calculated based at least in part on the customer's computing device configuration) to calculate a composite risk score for the provided set of credentials. Thus, as the customer enters one or more characters into the password input field 302, the authentication service may compute the risk score factor based at least in part on the provided one or more character and analyze the customer's user profile, activity logs, and computing device configuration information to calculate the risk score.

The interface 300 may include a credential rotation schedule field 310, which may be configured to display the calculated credential rotation schedule for the particular set of credentials specified within the password input field 302. The authentication service may utilize the calculated risk score to determine a credential rotation schedule for a particular set of credentials. This credential rotation schedule may be measured utilizing any measure of time (e.g., hours, days, weeks, months, years, etc.). The possible risk scores may be divided into particular ranges, wherein the range including the average risk score (e.g., the average value between the minimum possible risk score and maximum possible risk score) may correspond to a default time period for the credential rotation schedule. For instance, if the industry standard credential rotation period is defined at ninety days, the default time period for the credential rotation schedule may be defined as ninety days. Based at least in part on the calculated risk score, the authentication service may determine where in the range of possible credential rotation schedule periods the particular set of credentials lie.

Once the authentication service has determined the particular credential rotation schedule for the provided set of credentials, the authentication service may cause the interface to display the credential rotation schedule within the credential rotation schedule field 310. Since, in some embodiments, the particular credential rotation schedule may correspond to a range of risk scores, a change to the characters included within the password input field 302 may not necessarily result in a change to the credential rotation schedule displayed within the credential rotation schedule field 310. However, in some embodiments, the credential rotation schedule may be calculated with greater granularity such that a particular risk score may correspond to a particular credential rotation schedule. Thus, in such cases, the credential rotation schedule field 310 may be updated each time there is a change to the password input field 302.

In an embodiment, the customer, through the interface 300, can specify a desired credential rotation schedule through the credential rotation schedule field 310. In such instances, the authentication service may automatically generate a set of credentials for the customer that result in a risk score that, when used to calculate the credential rotation schedule, would cause the authentication service to obtain the desired credential rotation schedule. The authentication service thus may maintain a credential repository, comprising one or more algorithms that are configured to automatically and randomly generate credentials for the customer on demand. In an alternative embodiment, a customer can provide a first set of credentials through the password input field 302 that utilizes a variety of characters that the customer is comfortable with (e.g., only alphanumeric characters, numbers, etc.). The customer, regardless of the calculated credential rotation schedule, may indicate through the interface 300 that the authentication service should subsequently auto-generate credentials in the future that comport with the customer's credential preferences and maintain the calculated credential rotation schedule.

The interface 300 may include one or more buttons, such as an accept button 312 and a cancel button 314 to enable further customer interaction with the interface 300. For instance, once the customer is satisfied with the proposed set of credentials and the associated risk score and credential rotation schedule, the customer may select the accept button 312 to cause the service provider to enable the use of the set of credentials to access one or more services provided by the service provider. Alternatively, if the customer is not satisfied with the resulting risk score and the corresponding credential rotation schedule, or if the customer does not wish to utilize the interface 300 any longer, the customer may select the cancel button 314, which may cause the interface 300 to terminate without enabling the set of credentials to be utilized to access the one or more services provided by the service provider.

As noted above, a customer may be informed of the relative strength of his/her chosen set of credentials, the risk score associated with the set of credentials, and a corresponding credential rotation schedule through an interface provided by the service provider. In some instances, the selected set of credentials may result in a high risk score (e.g., greater risk of credential leakage), which, in turn, may result in severely diminished credential rotation schedule or, in some cases, rejection of the selected set of credentials. Accordingly, FIG. 4 shows an illustrative example of an interface 400 in which a risk score and a credential rotation schedule is provided to a customer in response to providing a weak set of credentials in accordance with at least one embodiment. The interface 400 may be similar to the interface described above in connection with FIG. 3. For instance, the interface 400 may include a password input field 402, a password confirmation input field 404, a password strength field 406, a risk score field 408, and a credential rotation schedule field 410.

When a customer, through use of the password input field 402, provides a set of credentials, the authentication service may determine, through use of the password complexity analyzer, that the provided set of credentials are weak (e.g., lacks complexity, comprises known dictionary terms, is of a relatively short length, etc.). The authentication service may provide the results of its analysis to the interface 400, which may display the relative strength of the proposed set of credentials within the password strength display field 406. Additionally, the interface 400 may provide additional output, such as utilizing the word "WEAK" as displayed in FIG. 4. Additionally, since the risk score factor may be affected by the relative strength of the provided set of credentials, the authentication service may calculate a higher risk score factor for a weaker set of credentials. This may have a negative impact on the overall risk score, as the factor may have a multiplicative effect on the calculation of the risk score.

The authentication service may calculate high risk score, which may denote a significant risk for credential leakage based at least in part on the set of credentials provided and other factors. For instance, the authentication service may determine, based at least in part on an analysis of the customer's activity logs and his/her user profile, that the customer is engaged in inherently risky activities and thus calculate a higher customer user profile risk score factor. For example, risky activities may include maintaining a plurality of credit card accounts within his/her user profile, making a significant number of transactions involving significant amounts of capital, utilizing multiple browser applications to access the service provider interface 400, and the like. Additionally, the customer may earn a significantly higher system configuration risk score factor if the authentication service determines, based at least in part on the system configuration of the customer's computing device and/or the applications installed or not installed on the computing device. For example, if the customer's computing device includes antiquated hardware, does not include trusted antivirus software, and/or includes known spyware or malware, the authentication service may calculate a higher system configuration risk score factor. The effect of having all risk score factors being high may correspond to a significantly higher risk score for the customer's proposed set of credentials.

If the authentication service calculates, based at least in part on all the various risk score factors, that the risk score is high, the authentication service may compute a greatly reduced credential rotation schedule for the customer's set of credentials. For instance, if the default credential rotation schedule is ninety days and corresponds to an average (e.g., relative to the possible minimum and maximum risk scores) risk score, a risk score that exceeds this average score may result in a credential rotation schedule that is lower than the default credential rotation schedule. This may result in the authentication service providing, within the credential rotation schedule field 410, a time period that is compressed when compared to the default credential rotation schedule.

In some embodiments, the authentication service may determine, based on a substantially high risk score, that the customer's request to utilize the proposed set of credentials should be denied. Under such circumstances, the authentication service may cause the interface 400 to display a message box, which may include one or more notifications informing the customer that he/she should select a different set of credentials or take other mitigating actions to reduce the risk score. Additionally, or alternatively, the authentication service may cause the interface 400 to disable the accept button 412 so that the customer may be unable to submit the set of credentials for use with the one or more services provided by the service provider. Thus, the customer may only be able to provide a new set of credentials through use of the password input field 402 or select the cancel button 414 to exit the interface 400 and perform one or more mitigating actions to reduce the risk score.

As noted above, the authentication service may continuously evaluate a customer's user profile, activity logs, computing device system configuration and other information to update the risk score and corresponding credential rotation schedule for the customer's set of credentials. In some embodiments, if the updated credential rotation schedule causes the customer's set of credentials to expire immediately, the customer, through an interface, may be prompted to update his/her set of credentials in order to access the one or more services provided by the service provider. Accordingly, FIG. 5 shows an illustrative example of an interface 500 in which a customer is required to create a new set of credentials as a result of an updated credential rotation schedule in accordance with at least one embodiment.

A customer may be required to provide his/her set of credentials through the interface 500 in order to log in to the service provider and access the one or more services to support his/her business needs. Through the interface 500, the customer may provide his user name and corresponding password through a user name input field 502 and password input field 504, respectively. Subsequently, the customer may select an accept button 516 to proceed through the login process. When the customer selects the accept button 516, the interface 500 may provide the customer's set of credentials to the authentication service, which may determine whether the set of credentials have expired based at least in part on a previous analysis of the customer's set of credentials and other information, as described above. Alternatively, in some embodiments, the authentication service may utilize the set of credentials, as well as the customer's user profile, activity logs, computing device system configuration and other information to calculate a new risk score and corresponding credential rotation schedule.

If the analysis performed by the authentication service results in an increased risk score and, as a result, the corresponding credential rotation schedule yields an expiration date that would cause the current set of credentials to be expired, the authentication service may cause the interface 500 to notify the customer of the expiration of his/her set of credentials. For instance, as illustrated in FIG. 5, if the updated risk score and credential rotation schedule has caused the provided set of credentials to be expired, the authentication service may cause the interface 500 to display a notice within a notification window 506 that the customer's set of credentials have expired due to an increase in the risk score since the customer's last use of the one or more services. Through the notification window 506, the authentication service may also inform the customer that he/she may be required to provide a new set of credentials immediately or within a specified period of time.

In some embodiments, the authentication service, through the interface 500, may enable the customer to immediately provide a new set of credentials for his/her account in the event that the customer's set of credentials have expired. For instance, as illustrated in FIG. 5, the authentication service may cause the interface 500 to provide a new password input field 508 and a password confirmation input field 510, which the customer may utilize to provide a new set of credentials and confirm that this set of credentials should be utilized. Similar to the interfaces described above in connection with FIGS. 3 and 4, the interface 500 may provide the string of characters being entered into the new password input field 508 to the authentication service, which may utilize a password complexity analyzer to determine the relative strength of the string of characters being entered into the new password input field 508 dynamically. Additionally, the authentication service may cause the interface 500 to display one or more indicators of the set of credential's relative strength. For instance, as illustrated in FIG. 5, the interface 500 may display a notification next to the new password input field 508 (e.g., "MEDIUM") to indicate to the customer the relative strength of the provided set of credentials.

The interface 500 may further include a credential rotation schedule field 514, which may be utilized by the authentication service to provide the customer with the credential rotation schedule calculated based at least in part on the composite risk score. For instance, the authentication service may utilize the proposed set of credentials entered into the new password input field 508, the customer's activity logs, the customer's user profile, the customer's computing device system configuration and other information to calculate one or more risk score factors. These one or more risk score factors may be used as inputs into one or more algorithms used to generate a composite risk score. Once the authentication service has calculated the composite risk score for the proposed set of credentials, the authentication service may calculate the corresponding credential rotation schedule, which it may provide to the customer through the credential rotation schedule field 514.

If the customer is satisfied with the newly provided set of credentials and the corresponding credential rotation schedule, the customer may select the accept button 516 to cause the authentication service to replace the previous set of credentials with the newly provided set of credentials and enable the customer to access the one or more services provided by the service provider. In some embodiments, the authentication service may cause the interface 500 to only inform the customer of the expiration of his/her set of credentials and provide the customer with a period of time before he/she is required to rotate his/her set of credentials. In such cases, the customer may access an alternative interface, such as the interfaces described above in connection with FIGS. 3 and 4, to rotate his/her credentials. If the customer does not want to change his/her set of credentials at this time or would like to exit the interface 500, the customer may select the cancel button 518, which may cause the termination of the interface 500.

It should be noted that in some embodiments, the customer may not be prompted for a new set of credentials in the event that the customer's current set of credentials have expired as a result of the update to the risk score and associated credential rotation schedule. For instance, as noted above, a customer may specify a desired credential rotation schedule and request that the authentication service automatically generate a set of credentials for the customer. In such instances, if the set of credentials expire, either through the normal expiration of the credential rotation schedule or a change in the risk score based at least in part on newly discovered risks associated with the automatically generated set of credentials, the authentication service may instead automatically generate a new set of credentials that comport with the customer's specified credential rotation schedule.

Figure 6:
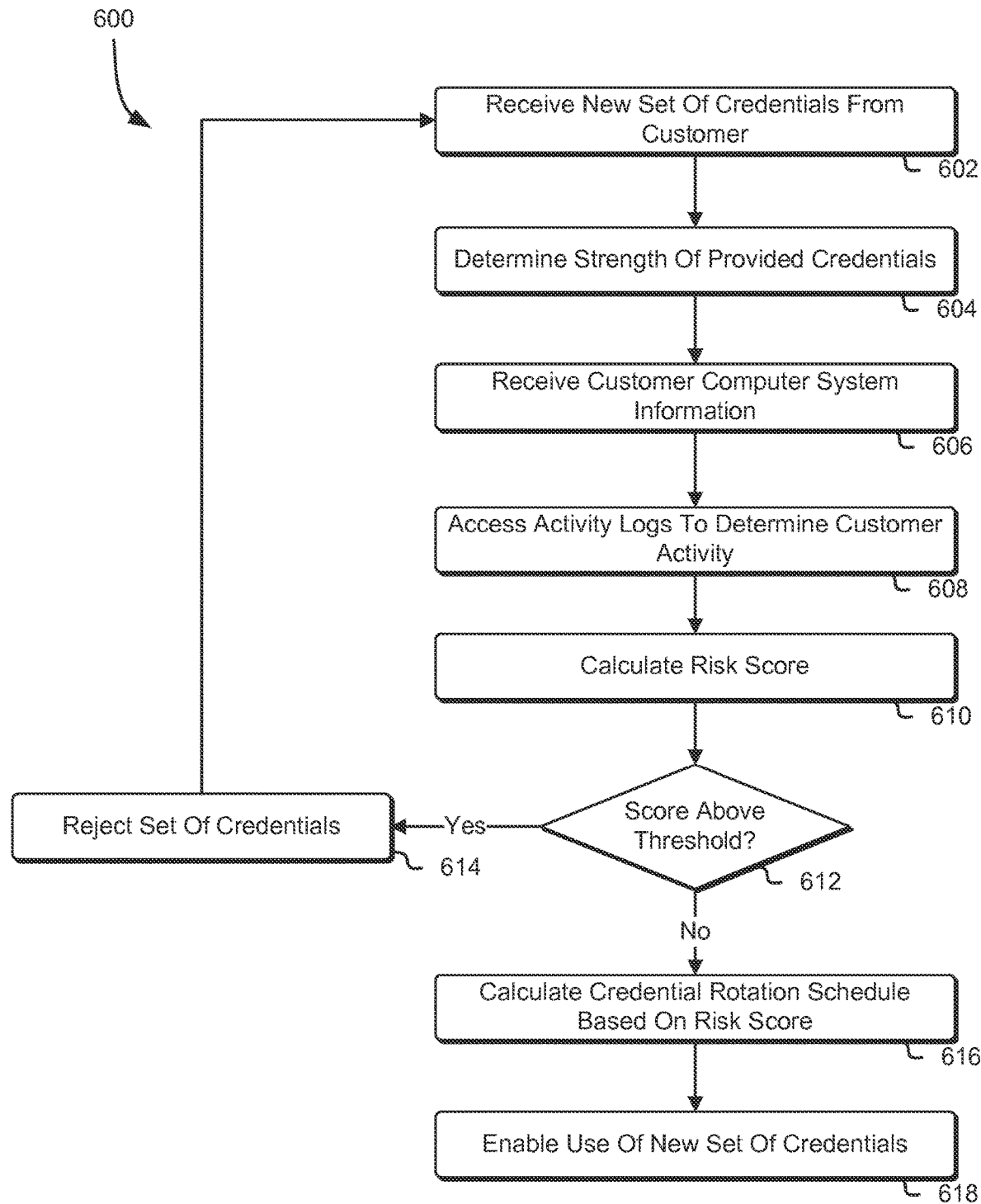
FIG. 6 shows an illustrative example of a process for calculating a risk score and a credential rotation schedule based at least in part on a customer profile and a proposed set of credentials provided by the customer in accordance with at least one embodiment.

As noted above, a customer may provide, through an interface, a proposed set of credentials that may potentially be used to access one or more services provided by the service provider. This may cause an authentication service to utilize the proposed set of credentials, as well as other information associated with the customer, to calculate a risk score and corresponding credential rotation schedule for the proposed set of credentials. Accordingly, FIG. 6 shows an illustrative example of a process 600 for calculating a risk score and a credential rotation schedule based at least in part on a customer profile and a proposed set of credentials provided by the customer in accordance with at least one embodiment. The process 600 may be performed by the aforementioned authentication service, which may be configured to interact with an interface to transmit to and receive information from a customer. Additionally, the authentication service may be configured to access a customer's activity logs and user profile, as maintained by the service provider, for obtaining information regarding the customer's interaction with the service provider.

When a customer wishes to create a new user account or update his/her set of credentials, the customer may access an interface (see FIGS. 3-5) and provide, through one or more input fields, a proposed set of credentials that may be used to access one or more services provided by the service provider. The interface may transmit this proposed set of credentials to the authentication service as the customer is providing input into the one or more input fields, causing a dynamic analysis of the proposed set of credentials. Thus, the authentication service may receive 602, from the customer, a new set of credentials that may potentially be utilized to access these one or more services.

Once the authentication service has received the proposed set of credentials from the customer through the interface, the authentication service may determine 604 the relative strength of the provided set of credentials. The authentication service may include a password complexity analyzer, which may be configured to analyze the proposed set of credentials to calculate an entropy level associated with the set of credentials. This entropy level may be utilized by the password complexity analyzer to determine the relative strength of the set of credentials and calculate a risk score factor for the set of credentials. As the customer changes the string of characters within the interface, the password complexity analyzer of the authentication service may dynamically calculate the strength of the proposed set of credentials and the associated risk score factor.

Subsequently, the authentication service may transmit one or more requests to the customer's computing device in order to receive 606 information regarding the customer's computer system or computing device. For instance, the authentication service may utilize this information determine the customer's computer system hardware and software configuration and a corresponding risk score factor based at least in part on the hardware and software configuration. For instance, if the computer system includes antiquated hardware and/or has a variety of known spyware/malware installed on the system, the authentication service may calculate a greater risk score factor for the customer's proposed set of credentials, as the computer system may be more vulnerable to attack or breach. Alternatively, if the computer system includes up-to-date hardware and/or a variety of security applications (e.g., anti-virus, firewall, etc.), then the authentication service may calculate a lower risk score factor, as the computer system may be less prone to attack or breach.

Once the authentication service has received the customer's computer system information and has calculated the corresponding risk score factor, the authentication service may transmit one or more requests to the service provider to access 608 one or more activity logs and the customer's user profile to determine customer's activities regarding the service provider and its one or more services. For instance, through the activity logs, the authentication service may evaluate all customer transactions and the amount of money spent with regard to these transactions. Additionally, the authentication service may be able to determine the networks through which the customer has accessed the service provider (e.g., public networks, private networks, etc.), as well as the browser applications utilized by the customer to access the service provider. The authentication service, through the customer's user profile, may also determine how many payment methods (e.g., authorized credit cards, direct bank transfers and associated bank accounts, etc.) may be utilized for these transactions and the delegated users that may utilize the customer's user account to access the one or more services. All this information may be utilized to calculate an additional risk score factor. If the customer's activities often occur within a public network, is involved in numerous transactions and enables other users to access his/her user account, the authentication service may calculate a higher risk score factor. Alternatively, if the customer utilized best practices (e.g., private networks, limited payment methods authorized, no other users permitted to utilize the account, etc.), the authentication service may calculate a lower risk score factor.

Once the authentication service has calculated the one or more risk score factors based on the obtained information, the authentication service may calculate 610 risk score for the provided set of credentials. For instance, in some embodiments, the authentication service may multiply the one or more risk score factors together to obtain a composite risk score. Alternatively, the risk score factors may be summed together. The algorithm to determine the severity of a particular risk score may be determined based at least in part on the greatest potential for credential leakage and a computed risk score for such a scenario. This may be defined as the maximum possible risk score. Each risk score factor may be weighted equally or, in some cases, differently based at least in part on one or more attenuating factors, such as known or recent detected methods for credential leakage.

The authentication service may define an upper threshold for a permissible risk score, wherein any risk score beyond this threshold may correspond to a set of credentials that are at too great a risk of credential leakage to be usable by the customer. Thus, the authentication service may utilize the calculated risk score to determine 612 whether the risk score is above this upper threshold. If the calculated risk score is above this threshold, the authentication service may reject 614 the customer's proposed set of credentials and enable the customer to propose a different set of credentials. This may cause the authentication service to calculate a new risk score for this different set of credentials.

If the calculated risk score does not exceed the maximum allowable threshold for the risk score, the authentication service may calculate 616 a credential rotation schedule that is based at least in part on the calculated risk score. For instance, the authentication service may utilize one or more algorithms that include the calculated risk score to calculate the credential rotation schedule. For example, the authentication service may utilize as a baseline credential rotation schedule that corresponds to an average risk score (e.g., relative to minimum and maximum possible risk scores) as a starting point for determining the credential rotation schedule based at least in part on the calculated risk score. The algorithms may either increase or decrease the credential rotation schedule based at least in part on whether the calculated risk score is below or above the average risk score, respectively.

Once the authentication service has calculated the credential rotation schedule based at least in part on the calculated risk score, the authentication service may enable

618 use of the new set of credentials to access the one or more services provided by the service provider. This may include enabling the customer to utilize the accept button within the interface to acknowledge acceptance of the proposed set of credentials. This may cause the authentication service to store a hash of the set of credentials, risk score and corresponding credential rotation schedule within a credential database for later use in determining whether the credentials have expired or to perform additional analyses to determine whether the credential rotation schedule needs to be adjusted due to new information. In some embodiments, the authentication service may store the set of credentials themselves.

Figure 7:
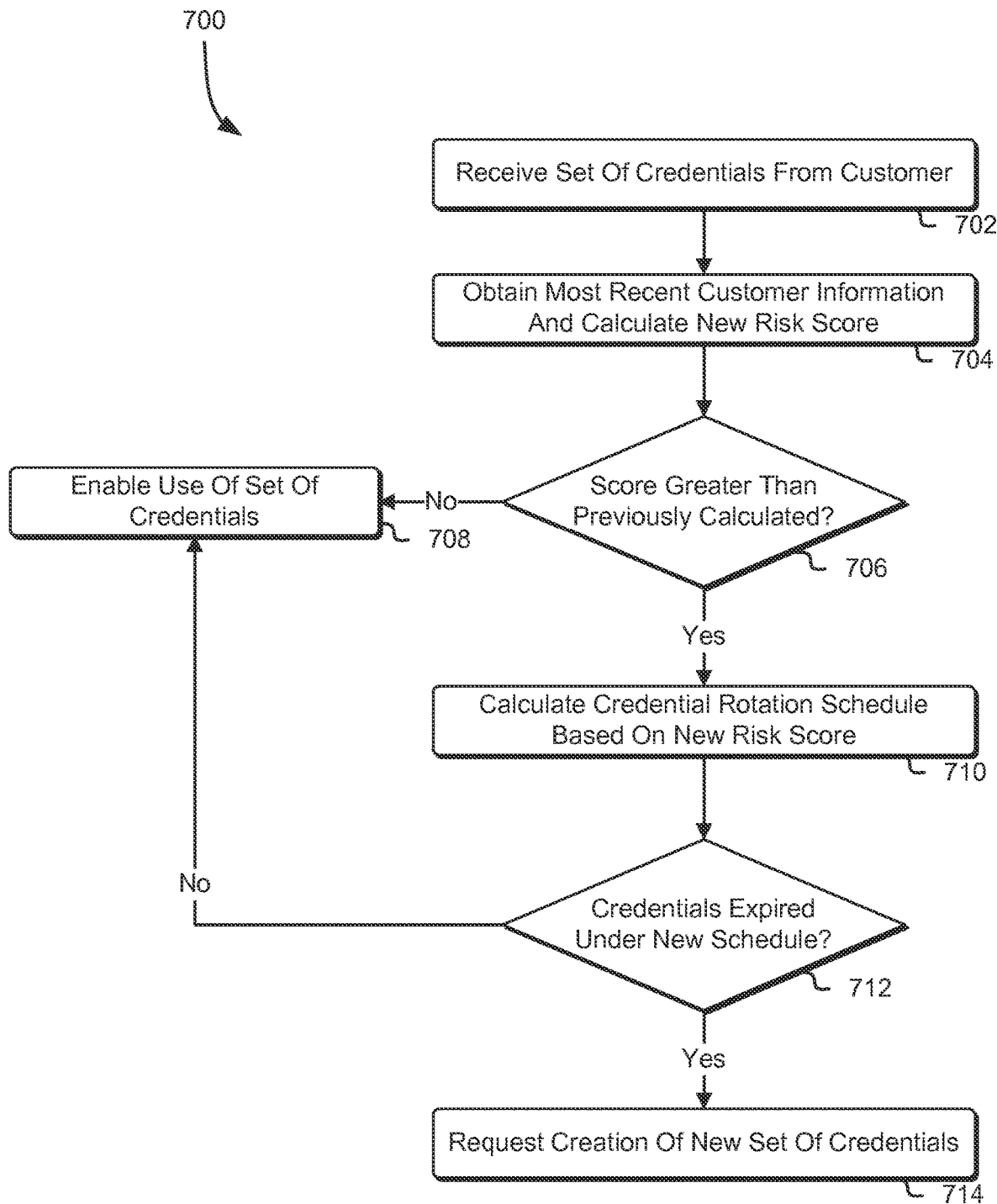
FIG. 7 shows an illustrative example of a process for updating a credential rotation schedule based at least in part on updates to a customer profile in accordance with at least one embodiment.

As noted above, the authentication service may continuously update the risk score and corresponding credential rotation schedule for a customer's set of credentials based at least in part on the customer's activities and changes to his/her user account and computer system. In some instances, updating the credential rotation schedule may cause the current set of credentials to expire, requiring the customer to update his/her set of credentials in order to access the one or more services provided by the service provider. Accordingly, FIG. 7 shows an illustrative example of a process 700 for updating a credential rotation schedule based at least in part on updates to a customer profile in accordance with at least one embodiment. The process 700 may be performed by the aforementioned authentication service which may be configured to interact with an interface to transmit to and receive information from a customer. Additionally, the authentication service may be configured to access a customer's activity logs and user profile, as maintained by the service provider, for obtaining information regarding the customer's interaction with the service provider.

When a customer tries to access one or more services provided by the service provider, he/she may be required to provide his/her set of credentials for authentication. Thus, the authentication service may receive 702, through an interface, a set of credentials from the customer. The authentication service may determine whether this set of credentials are indeed valid (e.g., correspond to the customer and have not expired under the current credential rotation schedule). If this set of credentials is not valid, the authentication may outright reject the customer's request to access the one or more services.

If the set of credentials from the customer are valid, the authentication service may obtain 704 the most recent customer information in order to calculate a new risk score for the customer's set of credentials. The authentication service may transmit a request to the service provider to obtain the customer's most recent activity logs (e.g., that have not been previously analyzed) and the customer's user profile to calculate a risk score factor. The authentication service may additionally transmit one or more requests to the customer's computing device in order to receive information regarding the customer's computer system or computing device (e.g., hardware and software configuration) to obtain a second risk score factor. The authentication service may further utilize a password complexity analyzer to calculate the relative strength of the customer's set of credentials and a corresponding complexity risk factor score.

The authentication service may utilize the computed risk factor scores to calculate the new risk score for the customer's set of credentials. Subsequently, the authentication service may compare the new risk score to the previously obtained risk score for the set of credentials to determine 706 whether the new risk score is greater than the previously calculated risk score. If the new risk score is less than the previously calculated risk score (e.g., lower risk of credential leakage), the authentication service may enable 708 the customer to utilize his/her set of credentials to access the one or more services provided by the service provider.

If the newly calculated risk score is greater than the previously calculated risk score, the authentication service may calculate 710 a credential rotation schedule that is based at least in part on the new risk score. The calculation of the credential rotation schedule may utilize one or more algorithms, such as those described above in connection with FIG. 6. Subsequently, the authentication service may determine 712 whether the customer's set of credentials would currently expire under this new credential rotation schedule. For instance, the authentication service, in response to calculation of the new credential rotation schedule may enforce this new credential rotation schedule as of the time when the original set of credentials was created by the customer. The authentication service may then calculate the remaining amount of time, if any, under the new credential rotation schedule.

Based at least in part on this new credential rotation schedule, if the authentication service determines that the set of credentials are still valid and have not expired, the authentication service may enable 708 continued use of these credentials. Additionally, if the new credential rotation schedule would require earlier rotation of the set of credentials, the authentication service may notify the customer, through the interface, of the new credential rotation schedule so that the customer is aware that he/she may be required to rotate his/her set of credentials earlier than anticipated. However, if the set of credentials have now expired due to implementation of the new credential rotation schedule, the authentication service may request 714 that the customer create a new set of credentials for use in accessing the one or more services provided by the service provider.

In some embodiments, the authentication service may notify the customer, through the interface, that his/her set of credentials have expired as a result of the calculation of a new credential rotation schedule. The authentication service may provide the customer with a short grace period wherein the set of credentials may still be utilized to access the one or more services and enable the customer to select a new set of credentials during this time. However, once the grace period has passed, the authentication service may require the customer to rotate his/her set of credentials and refuse any requests to access the one or more services until the customer has done so. In an alternative embodiment, the authentication service can force the customer to immediately rotate his/her set of credentials before he/she is permitted to access the one or more services. Once the customer has updated his/her credentials, the authentication service may calculate a new risk score and credential rotation schedule for this updated set of credentials according to the process 600 described above in connection with FIG. 6.

Figure 8:
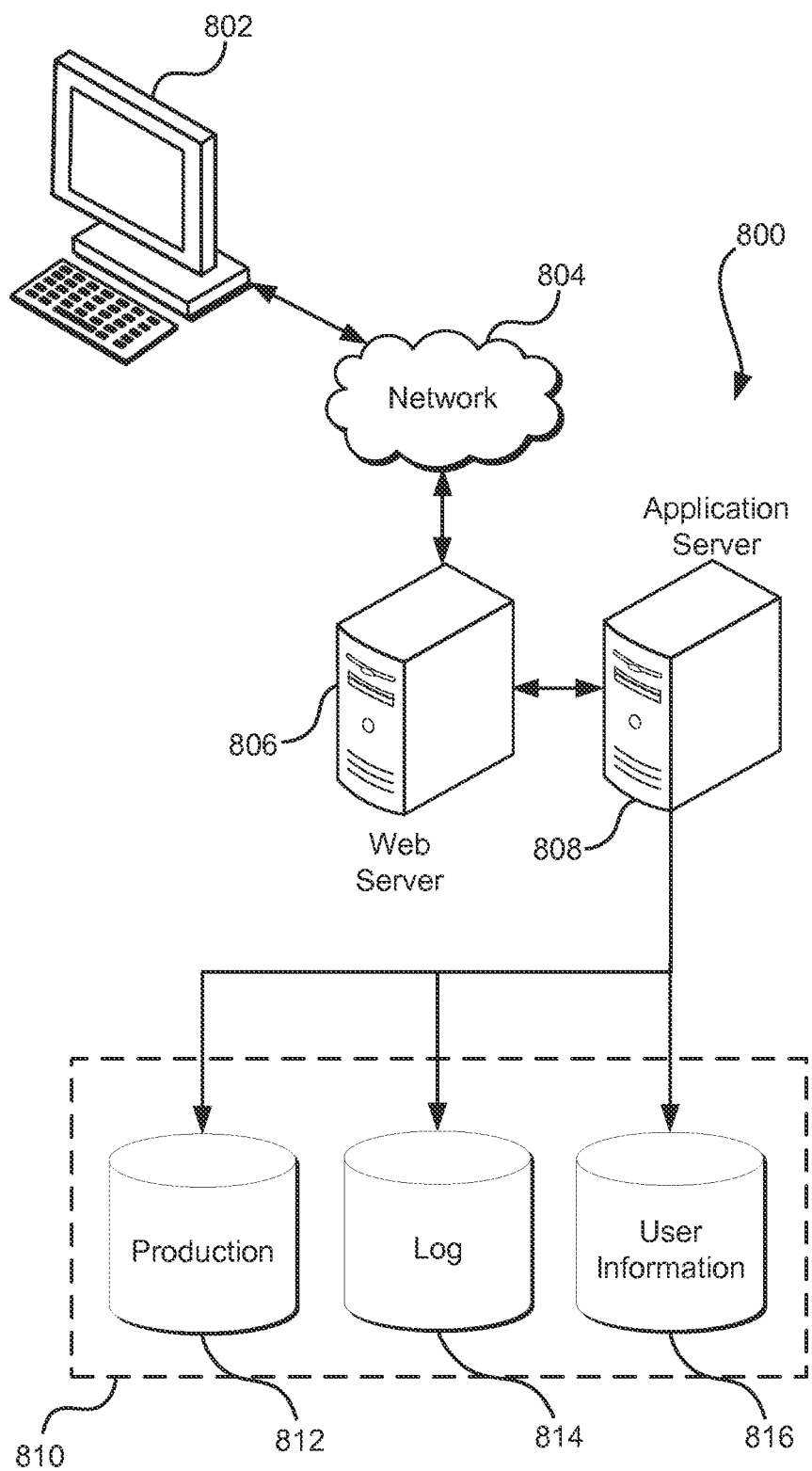
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part in response to the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a computing system operated by a customer, a credential for the customer associated with a service provider;
   determining a first risk score factor based at least in part on an entropy value for the credential;
   determining a second risk score factor based at least in part on a log including information generated as a result of one or more activities using the credential and performed by the customer in interacting with the service provider and payment information included in a customer profile corresponding to the customer;
   determining a third risk score factor based at least in part on a system configuration of the computing system, the system configuration indicating one or more applications installed on the computing system and supported by an operating system installed on the computing system;
   calculating a first composite risk score based at least in part on the first risk score factor, the second risk score factor, and the third risk score factor;
   determining, based at least in part on the first composite risk score, a first credential rotation schedule for the credential including a first amount of time that the credential is valid;
   updating an authentication server to enforce the first credential rotation schedule for the credential;
   calculating a second composite risk score based at least in part on an update of the first risk score factor, an update of the second risk score factor, and an update of the third risk score factor;
   determining, based at least in part on the second composite risk score, a second credential rotation schedule for the credential including a non-zero second amount of time that the credential is valid that is different from the first amount of time based at least in part on the second composite risk score; and
   updating the authentication server to enforce the second credential rotation schedule for the credential.

2. The computer-implemented method of claim 1, further comprising:
   determining, based at least in part on the second credential rotation schedule and the first credential rotation schedule currently in use for the credential, that the second credential rotation schedule causes the credential to expire before an expiration according to the first credential rotation schedule; and
   prompting the customer to provide a new credential.

3. The computer-implemented method of claim 1, wherein the second credential rotation schedule is presented through an interface provided to the customer through the computing system.

4. The computer-implemented method of claim 1, wherein calculating the first composite risk score further comprises weighing the first risk score factor, the second risk score factor, and the third risk score factor based at least in part on a likelihood of a particular mechanism for a potential credential leakage.

5. A system, comprising:
one or more processors; and
memory storing instructions that, as a result of being executed by the one or more processors, cause the system to:
receive a credential for an entity;
calculate a first risk score based at least in part on the credential, one or more activities associated with the credential and caused at least in part by a first operation performed by the entity and recorded in a log maintained by the system, payment information included in a profile corresponding to the entity, and a first system configuration of a first computing device associated with the credential, the first system configuration indicating a change to a first set of applications installed on the first computing device and supported by a first operating system installed on the first computing device;
determine; based at least in part on the first risk score, a first credential rotation schedule for the credential indicating a first amount of time for which the credential is valid;
update the first credential rotation schedule for the credential based at least in part on the first risk score;
determine; based at least in part on a second risk score, a second credential rotation schedule for the credential including a non-zero second amount of time that the credential is valid that is different from the first amount of time, the non-zero second amount of time being different than the first amount of time based at least in part on the second risk score, the second risk score comprising an update of the first risk score including one or more further activities associated with the credential and caused at least in part by a second operation performed by the entity and a second system configuration of a second computing device associated with the credential, the second system configuration indicating a second set of applications installed on the second computing device and supported by a second operating system installed on the second computing device; and
update an authentication server to enforce the second credential rotation schedule for the credential.

6. The system of claim 5, wherein the first computing device and the second computing device are the same computing device and the first operating system and the second operating system are the same operating system.

7. The system of claim 5, wherein the memory further includes instructions that, as a result of being executed by the one or more processors, cause the system to:
determine a first risk score factor based at least in part on a measure of complexity of the credential determined by a password complexity analyzer;
determine a second risk score factor based at least in part on a set of permissions included in the profile;
determine a third risk score factor based at least in part on the system configuration of the first computing device indicating a set of security risks the first computing device is exposed to; and
wherein the instructions that cause the system to calculate the first risk score further include instructions that, as a result of being executed by the one or more processors, cause the system to calculate the first risk score based at least in part on the first risk score factor, the second risk score factor, and the third risk score factor.

8. The system of claim 7, wherein the instructions that cause the system to calculate the first risk score further include instructions that, as a result of being executed by the one or more processors, cause the system to calculate the first risk score in a manner that at least one of the first risk score factor, the second risk score factor, or the third risk score factor is weighed based at least in part on an effect to a potential credential leakage.

9. The system of claim 5, wherein the memory further includes instructions that, as a result of being executed by the one or more processors, cause the system to reject the credential as a result of the first risk score being greater than a threshold value.

10. The system of claim 5, wherein the memory further includes instructions that as a result of being executed by the one or more processors, cause the system to:
generate a determination to update the credential as a result of the second credential rotation schedule causing the credential to expire before an expiration of the credential indicated in the first credential rotation schedule; and
transmit a request to the entity to provide a new credential in response to the determination.

11. The system of claim 5, wherein memory further includes instructions that, as a result of being executed by the one or more processors, cause the system to generate a new credential in response to an expiration of the credential included in the second credential rotation schedule.

12. The system of claim 5, wherein the memory further includes instructions that, as a result of being executed by the one or more processors, cause the system to:
determine the second risk score is less than the first risk score; and
as a result of the second risk score being less than the first risk score, allow access to the system using the credential.

13. A non-transitory computer-readable storage medium storing thereon executable instructions that, as a result of being executed by one or more processors of a computer system, cause the computer system to:
in response to receiving a credential, calculate a first risk score based at least in part on the credential, one or more activities associated with the credential and caused at least in part by an operation performed by a user during access to one or more services provided by a service provider, the one or more activities indicated in a log maintained by the service provider, payment information included in a user profile corresponding to the user, and a system configuration of a computing device from which the credential was received, the system configuration indicating one or more applications installed on the computing device and supported by an operating system installed on the computing device;
determine, based at least in part on the first risk score, a first credential rotation schedule for the credential indicating a first amount of time;
determine, based at least in part on a second risk score that is an update of the first risk score, a second credential rotation schedule for the credential indicating a non-zero second amount of time that is different from the first credential rotation schedule; and
update a computing device responsible for managing the credential.

14. The non-transitory computer-readable storage medium of claim 13, wherein the instructions further comprise instructions that, as a result of being executed by the one or more processors, cause the computer system to transmit a request to the user to generate a new credential as a result of the first risk score being greater than a threshold.

15. The non-transitory computer-readable storage medium of claim 13, wherein the instructions further comprise instructions that, as a result of being executed by the one or more processors, cause the computer system to:
compare the second credential rotation schedule to the first credential rotation schedule currently in use for the credential to generate a determination that the second credential rotation schedule causes the credential to expire before an expiration indicated in the first credential rotation schedule; and
transmit a request to the user to generate a new credential in response to the determination.

16. The non-transitory computer-readable storage medium of claim 13, wherein the instructions further comprise instructions that, as a result of being executed by the one or more processors, cause the computer system to transmit the first credential rotation schedule to an interface provided to the user through the computer device, causing the interface to display the first credential rotation schedule to the user.

17. The non-transitory computer-readable storage medium of claim 13, wherein the instructions further comprise instructions that, as a result of being executed by the one or more processors, cause the computer system to:
determine a first risk score factor based at least in part on the credential;
determine a second risk score factor based at least in part on information indicating credential leakage associated with the credential;
determine a third risk score factor based at least in part on system configuration information of the computing device; and
wherein the instructions that cause the computer system to calculate the first risk score further comprise instructions that, as a result of being executed by the one or more processors, cause the computer system to calculate the first risk score based at least in part on an algorithm that uses as inputs the first risk score factor, the second risk score factor, and the third risk score factor.

18. The non-transitory computer-readable storage medium of claim 17, wherein the algorithm weighs at least one of the first risk score factor, the second risk score factor, and the third risk score factor based at least in part on an effect to a potential credential leakage.

19. The non-transitory computer-readable storage medium of claim 13, wherein the instructions further comprise instructions that, as a result of being executed by the one or more processors, cause the computer system to, as a result of the second risk score being less than the first risk score, allow the user to utilize the credential to access the one or more services.

20. The non-transitory computer-readable storage medium of claim 13, wherein the instructions further comprise instructions that; as a result of being executed by the one or more processors, cause the computer system to modify, based at least in part on the first risk score, a set of permissions associated with operations that the user is allowed to perform.

* * * * *